United States Patent
Park et al.

(10) Patent No.: US 11,848,465 B2
(45) Date of Patent: Dec. 19, 2023

(54) INTEGRATED COOLING MODULE OF FUEL CELL STACK AND THERMAL MANAGEMENT SYSTEM INCLUDING INTEGRATED COOLING MODULE

(71) Applicants: HYUNDAI MOTOR COMPANY, Seoul (KR); KIA CORPORATION, Seoul (KR)

(72) Inventors: Sun Ae Park, Seongnam-si (KR); Jin Hun Lee, Yongin-si (KR); Hun Woo Park, Namyangju-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/837,567

(22) Filed: Jun. 10, 2022

(65) Prior Publication Data
US 2023/0050595 A1    Feb. 16, 2023

(30) Foreign Application Priority Data
Aug. 11, 2021    (KR) .......................... 10-2021-0105770

(51) Int. Cl.
| | |
|---|---|
| H01M 8/04 | (2016.01) |
| H01M 8/04007 | (2016.01) |
| H01M 8/04701 | (2016.01) |
| H01M 8/04746 | (2016.01) |

(52) U.S. Cl.
CPC ... *H01M 8/04074* (2013.01); *H01M 8/04731* (2013.01); *H01M 8/04768* (2013.01)

(58) Field of Classification Search
CPC ......... H01M 8/04074; H01M 8/04731; H01M 8/04768
See application file for complete search history.

(56) References Cited

U.S. PATENT DOCUMENTS

2012/0145280 A1* 6/2012 Kim .................. H01M 8/04768
                                                                141/11
2017/0361677 A1* 12/2017 Kim .................... H01M 10/663

* cited by examiner

*Primary Examiner* — Olatunji A Godo
(74) *Attorney, Agent, or Firm* — LEMPIA SUMMERFIELD KATZ LLC (57) ABSTRACT

An integrated cooling module of a fuel cell stack is attached to a housing of the fuel cell stack, and the integrated cooling module is connected to a plurality of components constituting a thermal management system of a fuel cell. In particular, the integrated cooling module includes: a first injection member defining flow paths guiding coolant into one or more components of the thermal management system of the fuel cell, and at least one second injection member coupled to the first injection member, and the coolants going through the components flow into the fuel cell stack through any one of the flow paths defined by the integrated cooling module.

20 Claims, 7 Drawing Sheets

INTEGRATED COOLING MODULE OF FUEL CELL STACK AND THERMAL MANAGEMENT SYSTEM INCLUDING INTEGRATED COOLING MODULE

CROSS-REFERENCE TO RELATED APPLICATION

The present application claims the benefit of and priority to Korean Patent Application No. 10-2021-0105770, filed on Aug. 11, 2021, the entire contents of which are incorporated herein by reference.

BACKGROUND

(a) Technical Field

The present disclosure relates to an integrated cooling module attached to a housing of a fuel cell stack and a thermal management system including the integrated cooling module.

(b) Background Art

The statements in this section merely provide background information related to the present disclosure and may not constitute prior art.

Generally, a thermal management system configured to perform the thermal management of a fuel cell stack controls the flow of coolant to adjust a temperature of the fuel cell stack. The thermal management system serves to dissipate the heat that is an electrochemical reaction byproduct of the fuel cell stack to the outside to properly control an operation temperature of the fuel cell stack and manage coolant. To implement the thermal management system, one or more components are connected to each of an input terminal and an output terminal of the fuel cell stack. At this time, the coolant flows through a separate pipe connecting between a plurality of components connected to the fuel cell stack. For example, each of the coolant inlet and outlet of the fuel cell stack generally has a valve located thereon, and interconnected to one or more other components through the pipe.

However, multiple pipes, fasteners, sealing members, and valves are required to implement the thermal management system, and multiple failures can occur as the number of components increases. In particular, if the multiple pipes are used, they are made of a special material for fuel cell by the chemical relationship between the fuel cell and the coolant, resulting in an increase in the material cost.

Further, there occur problems in that the labor is significantly required and an assembling process is complicated in a process of assembling the multiple pipes, fasteners, sealing members, and valves required for implementing the thermal management system. Further, as the multiple pipes are used, there is a problem in that the increasing volume of the entire thermal management system makes it difficult to miniaturize the thermal management system of the fuel cell.

The above information disclosed in this Background section is only for enhancement of understanding of the background of the disclosure and accordingly it may include information that does not form the prior art that is already known to a person of ordinary skill in the art.

SUMMARY OF THE DISCLOSURE

The present disclosure provides an integrated cooling module of a fuel cell stack and a thermal management system including the integrated cooling module capable of reducing the volume of a package necessary for implementing the thermal management system of the fuel cell and minimizing the number of components required for constituting the thermal management system of the fuel cell.

In one form of the present disclosure, the integrated cooling module of a fuel cell stack is attached to a housing of the fuel cell stack, and connected to a plurality of components constituting a thermal management system of the fuel cell. In another form of the present disclosure, the integrated cooling module comprises: a first injection member defining a plurality of flow paths configured to allow coolant to flow into at least one components among the plurality of components constituting the thermal management system of the fuel cell, and at least one second injection member coupled to the first injection member, and the coolants flowing through the at least one components of the thermal management system flows into the fuel cell stack through at least one of the flow paths among the plurality of flow paths defined by the first injection member.

According to another embodiment, the integrated cooling module is mounted with a valve configured to control the flow of the coolant, the first injection member includes a valve region defining a first flow path by being coupled to a valve injection member that is one of the at least one second injection members, and the coolant discharged from the fuel cell stack flows into the valve along the first flow path and a first valve inlet through which the coolant flows into the valve. The first valve inlet is a hole defined in in the valve region.

According to one embodiment, the first injection member is provided with a filter inlet and a filter discharge port connected to an ion filter, and the first injection member includes a filter region defining a second flow path by being coupled to a filter injection member that is one of the at least one second injection members and the coolant introduced from the ion filter flows into the valve along the second flow path.

According to one embodiment, a second valve inlet is defined in the filter region, and the coolant introduced through the second flow path flows into the second valve inlet.

According to one embodiment, the first injection member is provided with a pump port connected to a coolant pump, and the first injection member includes a COD heater region defining a third flow path and a fourth flow path by being coupled to a COD injection member that is one of the at least one second injection member, and the third flow path is configured to allow the coolant introduced from the coolant pump to flow into a COD heater and the fuel cell stack and the fourth flow path is configured to allow the coolant discharged from the COD heater to flow into the valve.

According to another embodiment, the COD injection member includes a first COD injection member defining the third flow path and a second COD injection member defining the fourth flow path, and the coolant flowing into the third flow path flows into the filter discharge port discharging the coolant into an inlet of the COD heater and the ion filter.

According to one embodiment, the COD heater is attached to the first injection member, and an inlet of the COD heater is defined in the COD heater region in which the third flow path is defined, and the discharge port of the COD heater and a third valve inlet are defined in the COD heater region in which the fourth flow path is defined.

According to one embodiment, the coolant flowing into the COD heater through the inlet of the COD heater flows into the fourth flow path through the discharge port of the COD heater, and the coolant flowing into the fourth flow path flows into the valve through the third valve inlet.

According to one embodiment, the first injection member is provided with a radiator port supplying the coolant to a radiator, and the coolant discharged from the fuel cell stack flows into the radiator port through the first flow path.

According to one embodiment, the COD heater and the valve are coupled to a first surface of the first injection member opposite to a second surface of the first injection member, and the at least one second injection members is attached to the second surface of the first injection member.

According to one embodiment, the first injection member includes a filter region defining a second flow path configured to flow the coolant introduced from an ion filter to flow into the valve by being coupled to a filter injection member that is one of at least one the second injection members; and a COD heater region defining a third flow path configured to flow the coolant introduced from a coolant pump into a COD heater and a fourth flow path configured to flow the coolant discharged from the COD heater into the valve by being coupled to a COD injection member that is one of the at least one second injection members, and the valve region, the filter region, and the COD heater region refer to recessed spaces from the at least one second injection members toward the first injection member.

According to one embodiment, the valve injection member, the filter injection member, and the COD injection member are provided in an integrated form.

A thermal management system including an integrated cooling module according to an embodiment of the present disclosure is provided. The thermal management system including the integrated cooling module includes the integrated cooling module attached to a housing of a fuel cell stack; a valve mounted on the integrated cooling module to control the flow of coolant; and a coolant pump connected to a pump port provided in the integrated cooling module, in which the integrated cooling module includes a first injection member defining a first flow path configured to flow the coolant discharged from the fuel cell stack into the valve and at least one second injection member coupled to the first injection member, and the first injection member includes a valve region defining the first flow path by being coupled to a valve injection member that is one of the at least one second injection members.

According to one embodiment, the pump port is provided to the first injection member, and the valve is coupled to a first surface of the first injection member which is opposite to a second surface of the first injection member, and the first injection member contacts the at least one second injection members on the second surface.

According to one embodiment, the first injection member is provided with a filter inlet and a filter discharge port connected to an ion filter, and the first injection member includes a filter region defining a second flow path configured to flow the coolant introduced from an ion filter into the valve by being coupled to a filter injection member that is one of the at least one second injection members.

According to one embodiment, the thermal management system includes a COD heater provided to a groove defined in the integrated cooling module, the first injection member includes a COD heater region defining a third flow path and a fourth flow path by being coupled to a COD injection member that is one of the at least one second injection member, and the third flow path is configured to flow the coolant introduced from the coolant pump into the COD heater and the fuel cell stack and the fourth flow path is configured to flow the coolant discharged from the COD heater into the valve.

According to one embodiment, a first valve is defined in the valve region and the coolant flows into the valve through the first valve inlet, a second valve inlet is defined in the filter region and the coolant flows into the valve through the second valve inlet, a third valve inlet is defined in the COD heater region in which the fourth flow path is defined so as to flow the coolant into the valve, and the first valve inlet, the second valve inlet, and the third valve inlet serve as ports directly communicating with the valve.

According to one embodiment, the valve is provided with a first port into which the coolant cooled by a radiator constituting the thermal management system of the fuel cell stack flows and a second port configured to flow the coolant into the coolant pump, and the valve and the first injection member are connected to the radiator, the fuel cell stack, the coolant pump, the COD heater, and the ion filter that constitute the thermal management system of the fuel cell stack.

According to one embodiment, the first injection member is provided with a radiator port supplying the coolant to a radiator, and the coolant discharged from the fuel cell stack flows into the radiator port through the first flow path.

According to one embodiment, the coolant flows into the valve and a COD heater through holes defined in the first injection member.

According to one embodiment of the present disclosure, the integrated cooling module mounted on the outer surface of the housing 50 of the fuel cell stack can control the flow of the coolant between the components constituting the thermal management system while serving as the flow path through which the coolant flows. The pipe, fastener, etc. required for constituting the thermal management system of the fuel cell may be used to a minimum. Therefore, it is possible to reduce the volume of the package required for implementing the thermal management system of the fuel cell and to reduce the cost required for constituting the thermal management system of the fuel cell.

According to one form of the present disclosure, the flow paths formed in the integrated cooling module can serve to connect the coolant pump with the COD heater, to connect the ion filter with the valve, to connect the fuel cell stack with the valve, and to connect the COD heater with the valve. Therefore, it is possible to reduce the length of the pipe connecting the coolant pump with the COD heater, and to reduce the length of the pipe connecting the ion filter with the valve. Further, it is possible to delete the pipe connecting the COD heater with the valve, and to delete the pipe connecting the fuel cell stack with the valve.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the disclosure are discussed infra.

BRIEF DESCRIPTION OF THE DRAWINGS

The above and other features of the present disclosure are now be described in detail with reference to certain exemplary examples thereof illustrated in the accompanying drawings which are given herein below by way of illustration only, and thus are not limitative of the present disclosure, and wherein.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Advantages and features of the present disclosure, and a method for achieving them should become apparent with reference to the embodiments described below in detail in conjunction with the accompanying drawings. However, the present disclosure is not limited to the embodiments disclosed below but may be implemented in various different forms, and only the present embodiment serves to complete the disclosure of the present disclosure, and to fully inform those having ordinary skill in the art to which the present disclosure pertains of the scope of the disclosure. Throughout the specification, the same reference numerals refer to the same components.

In the present disclosure, the reason why the names of the components are divided into the first, the second, etc. is to distinguish the names of the components having the same relationship, and the components are not necessarily limited to the order thereof in the following description.

The detailed description is illustrative of the present disclosure. Further, the above description shows and describes an embodiment of the present disclosure, and the present disclosure may be used in various other combinations, modifications, and environments. That is, changes or modifications are possible within the scope of the concept of the disclosure disclosed in the present disclosure, the scope equivalent to the described disclosure, and/or within the scope of the technology or the knowledge in the art. The described embodiment describes the best mode for implementing the technical spirit of the present disclosure, and various changes required in specific application fields and uses of the present disclosure are possible. Therefore, the detailed description of the disclosure is not intended to limit the present disclosure to the disclosed embodiments. Further, the appended claims should be construed to also include other embodiments.

Figure 1:
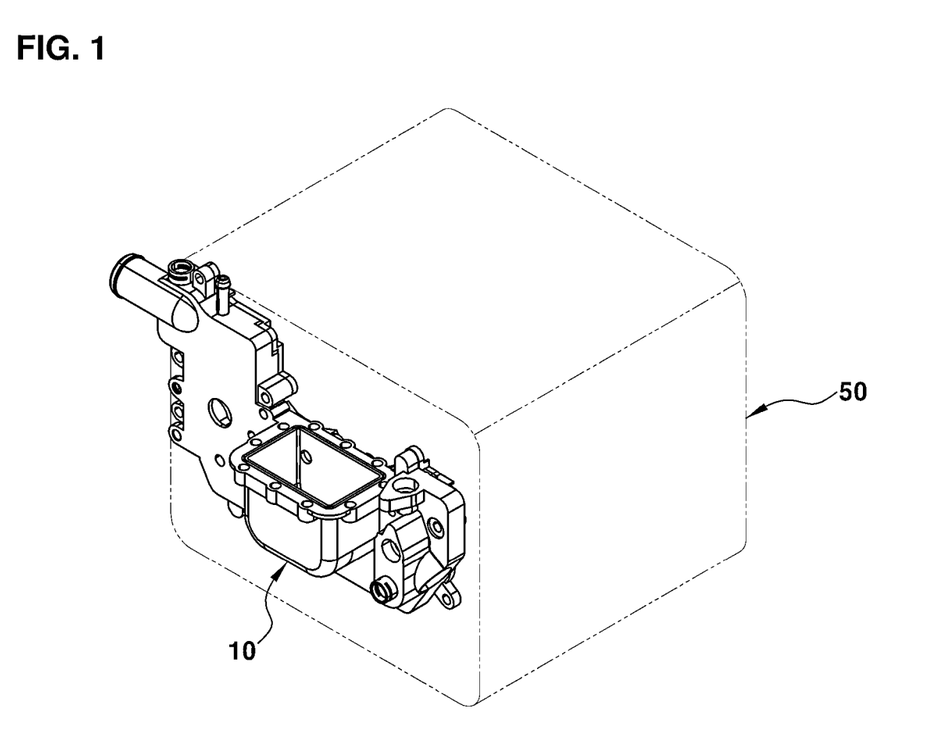
FIG. 1 is a perspective diagram showing an integrated cooling module attached to a housing of a fuel cell stack according to an embodiment of the present disclosure.
Figure 2:
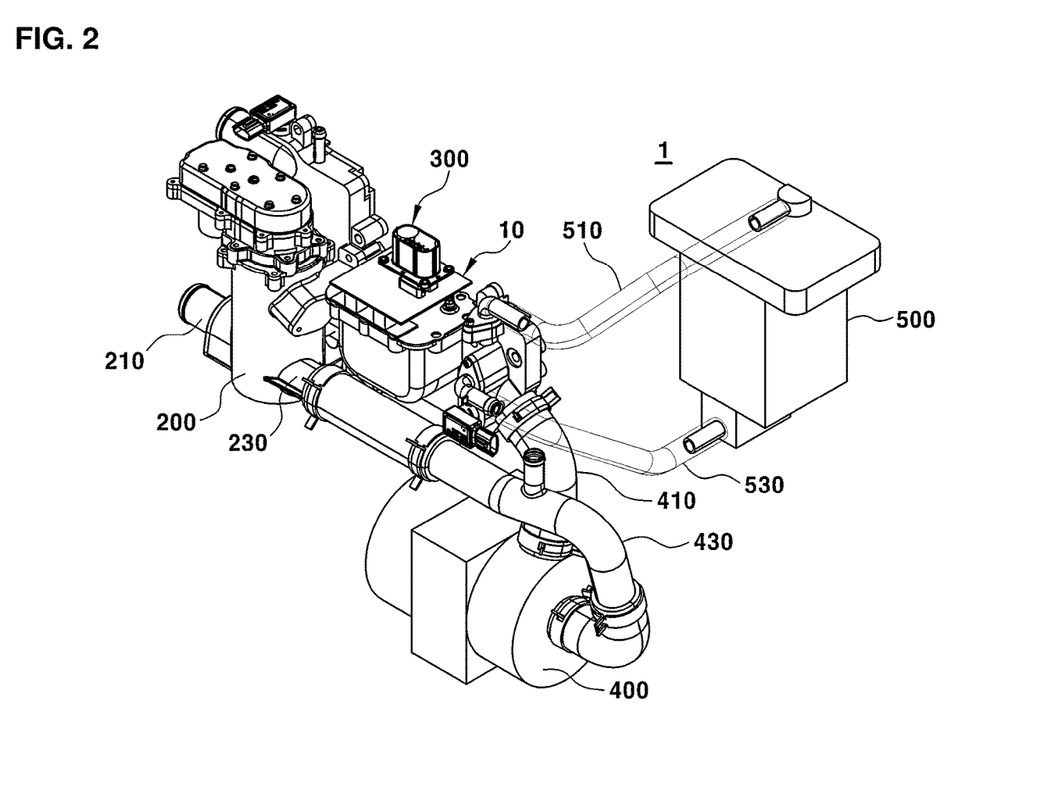
FIG. 2 is a perspective diagram showing a thermal management system including the integrated cooling module according to an embodiment of the present disclosure.

FIG. 1 is a perspective diagram showing an integrated cooling module attached to a housing of a fuel cell stack according to an embodiment of the present disclosure, and FIG. 2 is a perspective diagram showing a thermal management system including the integrated cooling module according to one form of the present disclosure.

Referring to FIGS. 1 and 2, a thermal management system (TMS) 1 of a fuel cell can be composed of a plurality components, such as a fuel cell stack (not shown), an integrated cooling module 10, a valve 200, a cathode oxygen depletion (COD) heater 300, a coolant pump 400, and an ion filter 500. The components constituting the thermal management system 1 of the fuel cell can be changed by a designer, but the thermal management system 1 of the fuel cell can include the fuel cell stack (not shown), the integrated cooling module 10, the valve 200, and the coolant pump 400.

The fuel cell stack (not shown) among the main components of the fuel cell system is a kind of the power generator, and can be a device configured to chemically react the oxygen in the air and the hydrogen supplied from the outside to generate electric energy. In particular, the thermal management system 1 of the fuel cell can serve to dissipate the heat that is an electrochemical reaction byproduct of the fuel cell stack (not shown) to the outside to optimally control an operation temperature of the fuel cell stack (not shown) and manage coolant. In other words, the thermal management system 1 of the fuel cell can control the heat generated by the fuel cell stack (not shown) using the coolant.

The integrated cooling module 10 can be attached to a housing 50 of the fuel cell stack (not shown). The integrated cooling module 10 can flow the coolant into at least component among the plurality of components constituting the thermal management system of the fuel cell or flow the coolant going through the plurality of components into the fuel cell stack (not shown). In other words, the coolant can flow into a coolant inlet (not shown) of the housing 50 of the fuel cell stack (not shown) through flow paths (not shown) defined in the integrated cooling module 10. The integrated cooling module 10 can control the flow of the coolant introduced into or discharged from each of the fuel cell stack (not shown), the valve 200, the COD heater 300, the coolant pump 400, and the ion filter 500 constituting the thermal management system 1 of the fuel cell. The integrated cooling module 10 is a component for minimizing pipes connecting between the components constituting the thermal management system 1 of the fuel cell, and the valve 200 and the COD heater 300 can be mounted on the integrated cooling module 10. Therefore, it is possible to delete a pipe connecting the integrated cooling module 10 with the valve 200, and a pipe connecting the integrated cooling module 10 with the COD heater 300. In other words, the integrated cooling module 10 can be a component capable of serving as a flow path through which the coolant flows and a valve controlling the flow of the coolant at the same time.

The valve 200 can be attached to the integrated cooling module 10. The valve 200 and the integrated cooling module 10 can be connected without separate pipe. In other words, the coolant flowing from the integrated cooling module 10 into the valve 200 can flow into the valve 200 through holes (not shown) formed in the integrated cooling module 10. A first port 210 into which the coolant cooled by a radiator (not shown) constituting the thermal management system 1 of the fuel cell flows and a second port 230 flowing the coolant into the coolant pump 400 can be provided to the valve 200. The valve 200 and the integrated cooling module 10 according to the exemplary embodiment of the present disclosure can perform substantially the same function as one 5-way valve.

The COD heater 300 can consume the power generated by the fuel cell stack (not shown) to increase the temperature of the coolant when the temperature of the coolant needs to be increased, or drop a voltage of the fuel cell stack (not shown). Therefore, the temperature of the coolant flowing into the COD heater 300 can be increased. The COD heater 300 can be attached to the integrated cooling module 10. The coolant can flow from the integrated cooling module 10 into the COD heater 300, and the coolant discharged from the COD heater 300 can flow into the valve 200 through the integrated cooling module 10.

The coolant pump 400 can provide the coolant delivered from the valve 200 to the integrated cooling module 10. The coolant can flow into the fuel cell stack (not shown), the COD heater 300, and the ion filter 500 through the plurality of flow paths defined in the integrated cooling module 10. The coolant discharged from the coolant pump 400 can flow into the integrated cooling module 10 through a first pipe 410, and the coolant discharged from the valve 200 can flow into the coolant pump 400 through a second pipe 430.

The ion filter 500 can remove the ions included in the coolant. The ion filter 500 can remove the ions included in the coolant provided by the coolant pump 400, and the coolant with the ions removed can be delivered to the integrated cooling module 10. The coolant discharged from the ion filter 500 can flow into the integrated cooling module 10 through a third pipe 510, and the coolant discharged from the integrated cooling module 10 can flow into the ion filter 500 through a fourth pipe 530.

According to the exemplary embodiment of the present disclosure, the integrated cooling module 10 mounted on an outer surface of the housing 50 of the fuel cell stack (not shown) can control the flow of the coolant between the components constituting the thermal management system 1 while serving as the flow path through which the coolant flows. The integrated cooling module 10 can substitute the role of the pipe required for flowing the coolant between the components constituting the thermal management system 1. In other words, the pipe, fastener, etc. required for constituting the thermal management system 1 of the fuel cell can be used to a minimum. Therefore, it is possible to reduce the volume of a package required for implementing the thermal management system 1 of the fuel cell, and to reduce the cost required for constituting the thermal management system 1 of the fuel cell.

Figure 3:
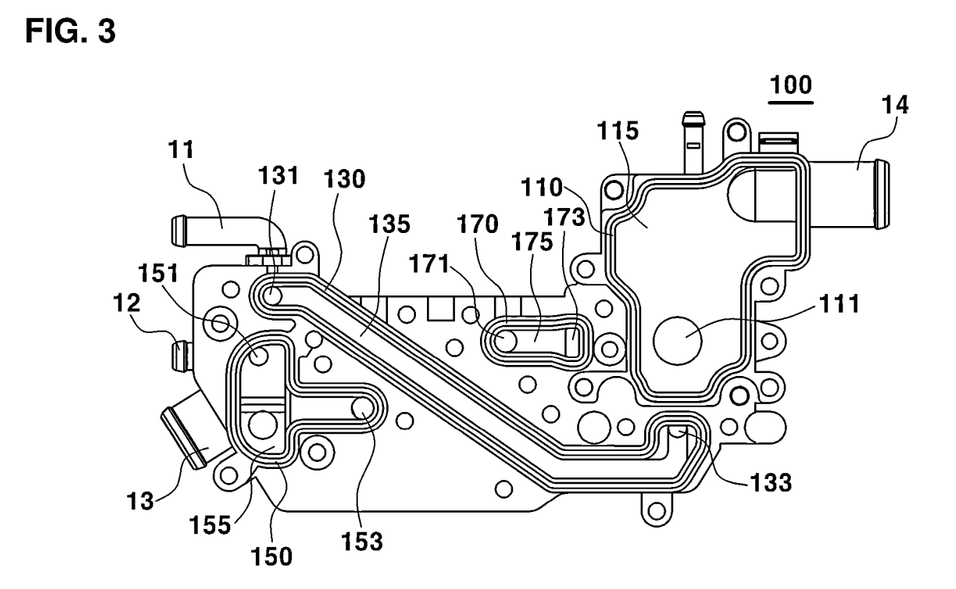
FIG. 3 is a diagram showing a first injection member according to an embodiment of the present disclosure.
Figure 4:
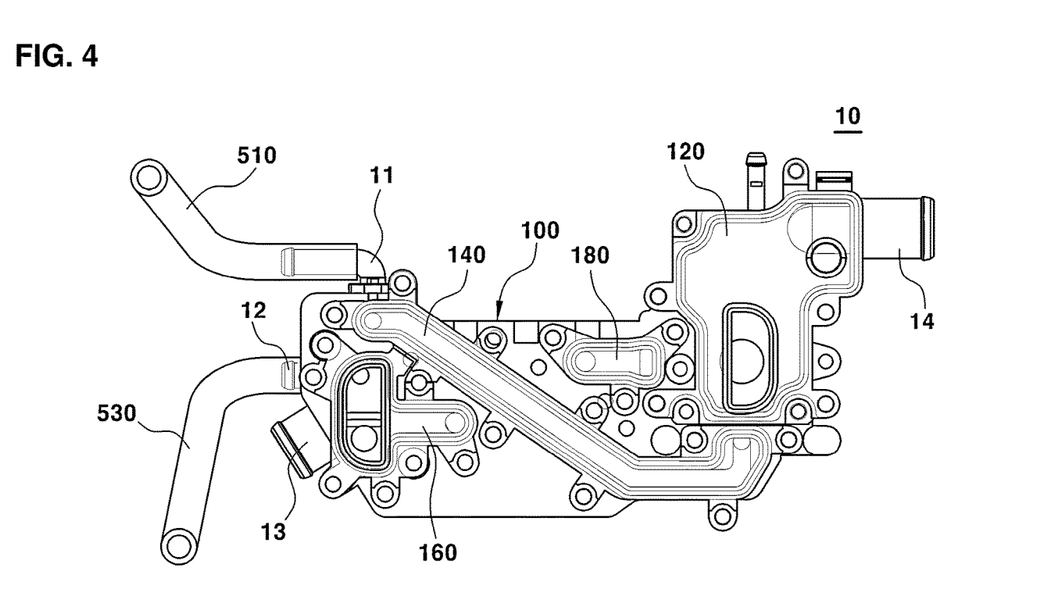
FIG. 4 is a diagram showing a second injection member coupled to the first injection member according to an embodiment of the present disclosure.

FIG. 3 is a diagram showing a first injection member according to the exemplary embodiment of the present disclosure, and FIG. 4 is a diagram showing a second injection member coupled to the first injection member according to the exemplary embodiment of the present disclosure.

Referring to FIGS. 1 to 4, the integrated cooling module 10 can include the first injection member 100 and one or more second injection members 120, 140, 160, 180. The integrated cooling module 10 can be manufactured by coupling the plurality of second injection members 120, 140, 160, 180 to one first injection member 100 integrally manufactured. For example, the second injection members 120, 140, 160, 180 can be coupled to the first injection member 100 using welding or bolting. The plurality of the second injection members 120, 140, 160, 180 can be provided. For example, the second injection members 120, 140, 160, 180 can be separate components separated from each other, and manufactured in an integral form coupled to each other.

The first injection member 100 can be mounted on the housing 50 of the fuel cell stack (not shown). Flow paths 115, 135, 155, 175 flowing the coolant into one or more components among the plurality of components constituting the thermal management system of the fuel cell can be defined in the first injection member 100. The second injection members 120, 140, 160, 180 can be disposed between the first injection member 100 and the housing 50. The flow paths 115, 135, 155, 175 of the integrated cooling module 10 can be defined by coupling the first injection member 100 with the second injection members 120, 140, 160, 180. The second injection members 120, 140, 160, 180 can include a valve injection member 120, a filter injection member 140, and COD injection members 160, 180. The flow paths 115, 135, 155, 175 can include a first flow path 115, a second flow path 135, a third flow path 155, and a fourth flow path 175. The coolant flowing into the integrated cooling module 10 can flow into the valve 200 and the COD heater 300 through holes defined in the first injection member 100.

The first injection member 100 can be provided with a filter inlet 11 and a filter discharge port 12 connected to the ion filter 500. The coolant can flow into the integrated cooling module 10 through the filter inlet 11, and the coolant in the integrated cooling module 10 can be discharged into the ion filter 500 through the filter discharge port 12.

The first injection member 100 can be provided with a pump port 13 connected to the coolant pump 400. The coolant supplied from the coolant pump 400 can flow into the integrated cooling module 10 through the pump port 13.

The first injection member 100 can be provided with a radiator port 14 configured to supply the coolant to the radiator (not shown). The coolant discharged from the housing 50 can flow into the radiator port 14 through the first flow path 115.

The first injection member 100 can be classified into a valve region 110 defining the first flow path 115, a filter region 130 defining the second flow path 135, and COD heater regions 150, 170 defining the third flow path 155 and the fourth flow path 175. The valve region 110, the filter region 130, and the COD heater regions 150, 170 can refer to specific regions defined on one surface of the first injection member 100. One surface of the first injection member 100 can refer to a surface to which the second injection members 120, 140, 160, 180 are coupled, and the other surface of the first injection member 100 can refer to a surface exposed to the outside as the surface opposite to one surface. In other words, one surface of the first injection member 100 cannot be exposed to the outside by the coupling between the first injection member 100 and the housing 50.

The valve region 110 can define the first flow path 115 by being coupled to a valve injection member 120 that is one of the second injection members 120, 140, 160, 180. The first flow path 115 can be a passage through which the coolant introduced from the housing 50 of the fuel cell stack (not shown) flows. In other words, the first flow path 115 can be a flow path connected to a coolant discharge port (not shown) of the housing 50. A first valve inlet 111 that is a hole configured to flow the coolant into the valve 200 can be defined in the valve region 110. In other words, the coolant discharged from the housing 50 of the fuel cell stack (not shown) can flow into the valve 200 through the first valve inlet 111. In other words, the integrated cooling module 10 and the valve 200 can communicate with each other through the first valve inlet 111 without separate pipe.

The filter region 130 can define the second flow path 135 by being coupled to the filter injection member 140 that is one of the second injection members 120, 140, 160, 180. The second flow path 135 can be a passage through which the coolant introduced from the ion filter 500 flows. The second flow path 135 can flow the coolant introduced from the ion filter 500 to the valve 200. A filter hole 131 configured to flow the coolant introduced through the filter inlet 11 into the second flow path 135 and a second valve inlet 133 that is a hole for flowing the coolant flowing into the second flow path 135 into the valve 200 can be defined in the filter region 130. In other words, the coolant introduced from the ion filter 500 can flow into the valve 200 through the second valve inlet 133. In other words, the integrated cooling module 10 and the ion filter 500 are coupled by the pipe, but it is possible to reduce a length of the pipe connecting the integrated cooling module 10 and the ion filter 500 by the second flow path 135 in the integrated cooling module 10.

The COD heater regions 150, 170 can define the third flow path 155 and the fourth flow path 175 by being coupled to a COD injection member 160 or 180 that is one of the second injection members 120, 140, 160, 180. The COD heater regions 150, 170 can include a first COD heater region 150 and a second COD heater region 170. The COD injection members 160, 180 can include a first COD injection member 160 defining the third flow path 155 by being coupled to the first COD heater region 150 and a second COD injection member 180 defining the fourth flow path 175 by being coupled to the second COD heater region 170. The third flow path 155 can flow the coolant introduced from the coolant pump 400 into the filter discharge port 12 and/or the COD heater 300. The fourth flow path 175 can flow the coolant discharged from the COD heater 300 into the valve 200. Further, the coolant flowing into the third flow path 155 can be connected to the coolant inlet of the housing 50 of the fuel cell stack (not shown) to be supplied to the fuel cell stack (not shown). At this time, the COD heater 300 can be attached to the other surface of the first injection member 100. A coolant pump hole (not shown) into which the coolant flows from the coolant pump 400, a discharge hole 151 configured to flow the coolant into the filter discharge port 12, and a COD inlet 153 configured to flow the coolant into the COD heater 300 can be defined in the first COD heater region 150. A COD discharge port 171 into which the coolant is discharged from the COD heater 300 and a third valve inlet 173 configured to flow the coolant into the valve 200 can be defined in the second COD heater region 170. The COD inlet 153, the COD discharge port 171, and the third valve inlet 173 can be provided in a hole form.

As an example, the valve injection member 120, the filter injection member 140, and the COD injection members 160, 180 can be provided in a form separated from each other. However, the valve injection member 120, the filter injection member 140, and the COD injection members 160, 180 can be provided in an integral form connected to each other.

As an example, the coolant supplied from the coolant pump 400 can flow into the third flow path 155 in the integrated cooling module 10 through the pump port 13. The coolant flowing into the third flow path 155 can be discharged into the ion filter 500 through the discharge hole 151. The coolant flowing into the third flow path 155 can flow into the COD heater 300 through the COD inlet 153. The coolant heated by the COD heater 300 can flow into the fourth flow path 175 through the COD discharge port 171. The coolant flowing into the fourth flow path 175 can flow into the valve 200 through the third valve inlet 173. The third flow path 155 can serve to connect the coolant pump 400 with the COD heater 300, and the fourth flow path 175 can serve to connect the COD heater 300 with the valve 200. Therefore, it is possible to reduce the length of the pipe connecting the coolant pump 400 with the COD heater 300, and the pipe connecting the COD heater 300 with the valve 200 cannot be required.

As an example, the coolant supplied from the ion filter 500 can flow into the second flow path 135 in the integrated cooling system 10 through the filter inlet 11 and the filter hole 131. The coolant flowing into the second flow path 135 can flow into the valve 200 through the second valve inlet 133. In other words, the second flow path 135 can serve to connect the ion filter 500 with the valve 200. Therefore, it is possible to reduce the length of the pipe connecting the ion filter 500 with the valve 200.

As an example, the coolant supplied from the housing 50 of the fuel cell stack (not shown) can flow into the first flow path 115 in the integrated cooling module 10. The coolant flowing into the first flow path 115 can flow into the valve 200 through the first valve inlet 111. In other words, the first flow path 115 can serve to connect the housing 50 of the fuel cell stack (not shown) with the valve 200. Therefore, it is possible to delete the pipe connecting the housing 50 of the fuel cell stack (not shown) with the valve 200.

As an example, the COD heater 300 and the valve 200 can be coupled to the other surface opposite to one surface to which the second injection members 120, 140, 160, 180 are attached with respect to the first injection member 100.

According to the exemplary embodiment of the present disclosure, the flow paths 115, 135, 155, 175 formed in the integrated cooling module 10 can serve to connect the coolant pump 400 with the COD heater 300, to connect the ion filter 500 with the valve 200, to connect the fuel cell stack (not shown) with the valve 200, and to connect the COD heater 300 with the valve 200. Therefore, it is possible to reduce the length of the pipe connecting the coolant pump 400 with the COD heater 300, and to reduce the length of the pipe connecting the ion filter 500 with the valve 200. Further, it is possible to delete the pipe connecting the COD heater 300 with the valve 200, and to delete the pipe connecting the housing 50 of the fuel cell stack (not shown) with the valve 200.

Figure 5:
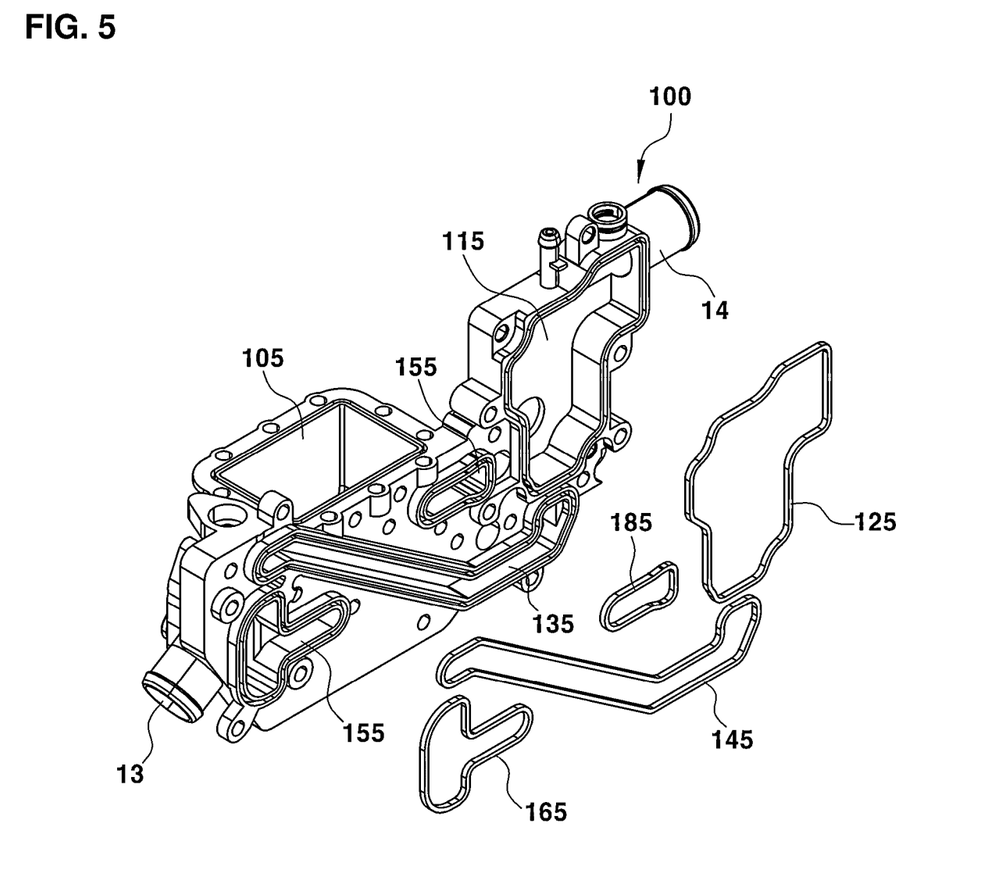
FIG. 5 is a diagram showing a sealing member according to an embodiment of the present disclosure.

FIG. 5 is a diagram showing a sealing member according to the exemplary embodiment of the present disclosure.

Referring to FIGS. 3 to 5, the valve region 110, the filter region 130, and the COD heater regions 150, 170 of the first injection member 100 can refer to recessed spaces from the second injection members 120, 140, 160, 180 toward the first injection member 100. In other words, the valve region 110, the filter region 130, and the COD heater regions 150, 170 can define spaces for defining the flow paths 115, 135, 155, 175 through which the coolant flows. In other words, the flow paths 115, 135, 155, 175 of the integrated cooling module 10 can be defined by coupling the first injection member 100 with the second injection members 120, 140, 160, 180.

The other surface of the first injection member 100 can be provided with a pocket part 105 that is a space provided by the COD heater 300. The coolant can flow into the pocket part 105 through the COD inlet 153, and the coolant in the pocket part 105 can flow into the fourth flow path 175 through the COD discharge port 171.

Sealing members 125, 145, 165, 185 can be provided between the first injection member 100 and the second injection members 120, 140, 160, 180. Specifically, a first sealing member 125 can be provided between the first injection member 100 and the valve injection member 120, a second sealing member 145 can be provided between the first injection member 100 and the filter injection member 140, a third sealing member 165 can be provided between the first injection member 100 and the first COD injection member 160, and a fourth sealing member 185 can be provided between the first injection member 100 and the second COD injection member 180. The first sealing member 125, the second sealing member 145, the third sealing member 165, and the fourth sealing member 185 can serve to seal spaces between the first injection member 100 and the second injection members 120, 140, 160, 180 to prevent the coolant from leaking into the spaces.

The first sealing member 125, the second sealing member 145, the third sealing member 165, and the fourth sealing member 185 can be inserted into grooves formed in the first injection member 100 or the second injection members 120, 140, 160, 180. In other words, the spaces into which the first sealing member 125, the second sealing member 145, the third sealing member 165, and the fourth sealing member 185 are inserted can be formed in any one of the first injection member 100 or the second injection members 120, 140, 160, 180.

Figure 6:
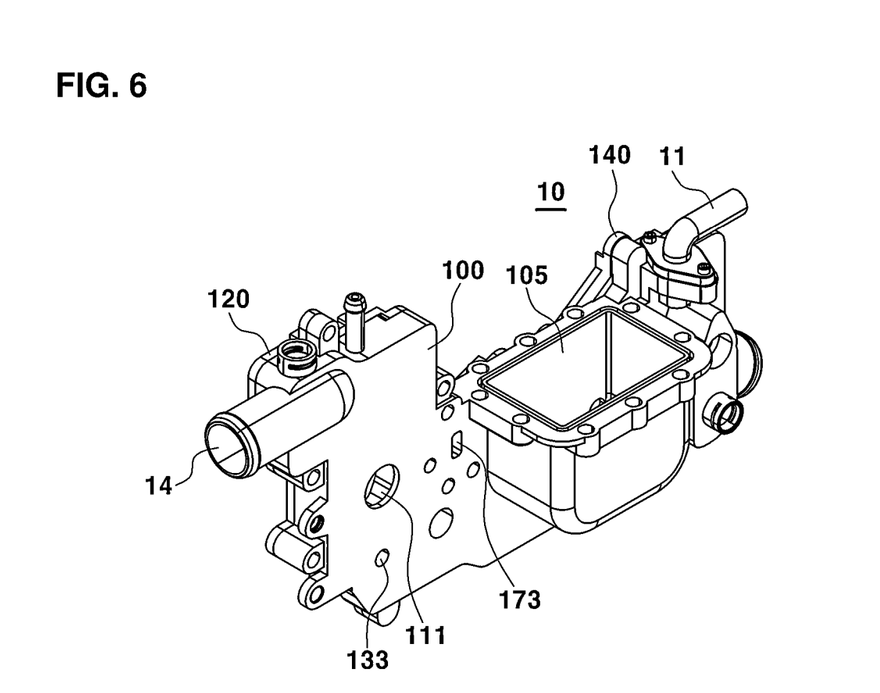
FIG. 6 is a diagram showing valve inlets of the integrated cooling module according to an embodiment of the present disclosure.
Figure 7:
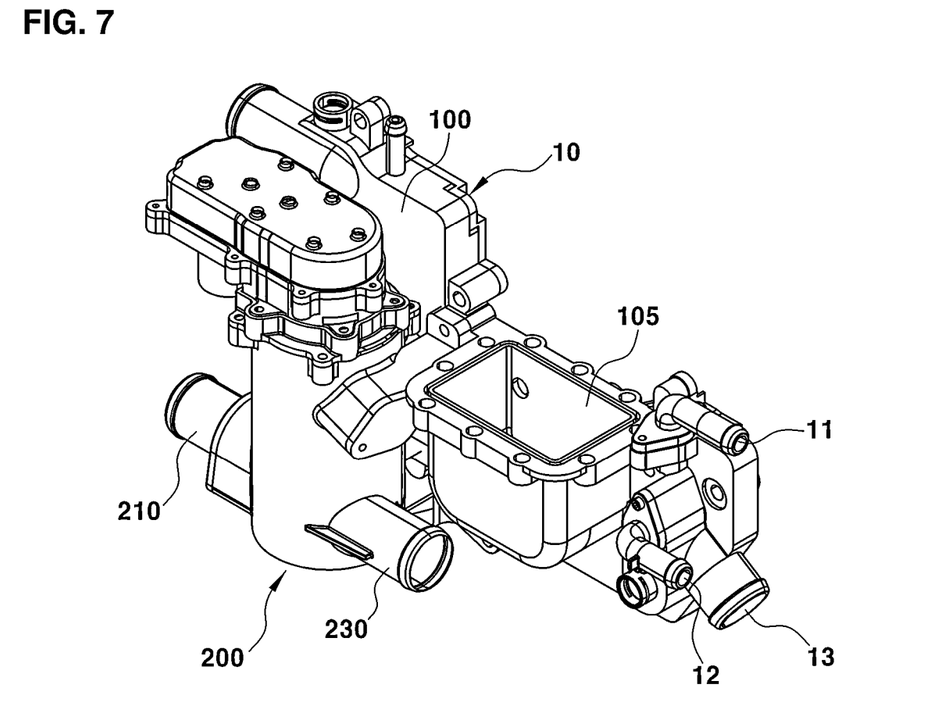
FIG. 7 is a diagram showing a state where the valve is mounted on the integrated cooling module according to an embodiment of the present disclosure.

FIG. 6 is a diagram showing valve inlets of the integrated cooling module according to the exemplary embodiment of the present disclosure, and FIG. 7 is a diagram showing a state where the valve is mounted on the integrated cooling module according to the exemplary embodiment of the present disclosure.

Referring to FIGS. 6 and 7, the coolants introduced through the first valve inlet 111, the second valve inlet 133, and the third valve inlet 173 formed in the first injection member 100 of the integrated cooling module 10 can flow into the valve 200. When the coolants flow from the fuel cell stack (not shown), the COD heater 300, and the ion filter 500 into the integrated cooling module 10, the integrated cooling module 10 can flow the coolant into the valve 200. In other words, the first valve inlet 111, the second valve inlet 133, and the third valve inlet 173 can serve as ports directly communicating with the valve 200. The coolant cooled by the radiator (not shown) can flow into the valve 200 without going through the integrated cooling module 10. The valve 200 can provide the coolant introduced from the integrated cooling module 10 and the radiator (not shown) to the coolant pump 400.

The valve 200 can control the flow of the coolant through the openings or closings of the first valve inlet 111, the second valve inlet 133, and the third valve inlet 173. The valve 200 can be formed in a multilayer structure for opening or closing the first valve inlet 111, the second valve inlet 133, and the third valve inlet 173 formed in different heights. The valve 200 can open or close the first valve inlet 111, the second valve inlet 133, and the third valve inlet 173 depending upon a mode of the fuel cell to set a loop through which the coolant flows.

As described above, while the various embodiments of the present disclosure have been described with reference to the accompanying drawings, it may be understood by those having ordinary skill in the art to which the present disclosure pertains that the present disclosure may be carried out in various specific forms without changing the technical spirit or the main features thereof. Therefore, it should be understood that the aforementioned embodiments are illustrative and not restrictive in all respects.

What is claimed is:

1. An integrated cooling module of a fuel cell stack, comprising:
   a first injection member including a plurality of regions and coupled to at least one second injection member, the plurality of regions configured to form spaces when coupled with the at least one second injection member, wherein the spaces are configured to define flow paths configured to respectively flow coolant to at least one component among a plurality of components of a thermal management system of the fuel cell stack,
   wherein the integrated cooling module is connected to the plurality of components of the thermal management system, and
   wherein the coolant flowing through the at least one component of the thermal management system flows into the fuel cell stack through at least one flow path among the flow paths defined by the first injection member and the at least one second injection member, and
   wherein the integrated cooling module is mounted with a valve configured to control a flow of the coolant, and the valve and the integrated cooling module is connected without a pipe.

2. The integrated cooling module of claim 1,
   wherein the plurality of regions comprises a valve region defining a first flow path, among the flow paths, by being coupled to a valve injection member that is one of the at least one second injection member, and the coolant discharged from the fuel cell stack flows into the valve along the first flow path, and
   wherein a first valve inlet is defined in the valve region and the coolant flows into the valve through the first valve inlet.

3. The integrated cooling module of claim 2,
   wherein the first injection member is provided with a filter inlet and a filter discharge port connected to an ion filter, and
   wherein the plurality of regions comprises a filter region defining a second flow path, among the flow paths, by being coupled to a filter injection member that is one of the at least one second injection member, and the coolant introduced from the ion filter flows into the valve along the second flow path.

4. The integrated cooling module of claim 3,
   wherein a second valve inlet is defined in the filter region, and the coolant introduced through the second flow path flows into the valve through the second valve inlet.

5. The integrated cooling module of claim 3,
   wherein the first injection member is provided with a pump port connected to a coolant pump, and
   wherein the plurality of regions comprises a COD heater region defining a third flow path and a fourth flow path, among the flow paths, by being coupled to a COD injection member that is one of the at least one second injection member, and
   wherein the third flow path is configured to allow the coolant introduced from the coolant pump to flow into a COD heater and the fuel cell stack, and the fourth flow path is configured to allow the coolant discharged from the COD heater to flow into the valve.

6. The integrated cooling module of claim 5,
wherein the COD injection member comprises: a first COD injection member defining the third flow path and a second COD injection member defining the fourth flow path, and
wherein the coolant flowing into the third flow path flows into the filter discharge port discharging the coolant into an inlet of the COD heater and the ion filter.

7. The integrated cooling module of claim 5,
wherein the COD heater is attached to the first injection member, and
wherein an inlet of the COD heater is defined in the COD heater region in which the third flow path is defined, and a discharge port of the COD heater and a third valve inlet are defined in the COD heater region in which the fourth flow path is defined.

8. The integrated cooling module of claim 7,
wherein the coolant flowing into the COD heater through the inlet of the COD heater flows into the fourth flow path through the discharge port of the COD heater, and
wherein the coolant flowing into the fourth flow path flows into the valve through the third valve inlet.

9. The integrated cooling module of claim 5,
wherein the COD heater and the valve are coupled to a first surface of the first injection member opposite to a second surface of the first injection member, and the at least one second injection member is attached to the second surface of the first injection member.

10. The integrated cooling module of claim 2,
wherein the first injection member is provided with a radiator port supplying the coolant to a radiator, and
wherein the coolant discharged from the fuel cell stack flows into the radiator port through the first flow path.

11. The integrated cooling module of claim 2,
wherein the plurality of regions comprises:
a filter region defining a second flow path, among the flow paths, configured to flow the coolant introduced from an ion filter to flow into the valve by being coupled to a filter injection member that is one of the at least one second injection member; and
a COD heater region defining, among the flow paths, a third flow path configured to flow the coolant introduced from a coolant pump into a COD heater and a fourth flow path configured to flow the coolant discharged from the COD heater into the valve by being coupled to a COD injection member that is one of the at least one second injection member, and
wherein the valve region, the filter region, and the COD heater region refer to recessed spaces from the at least one second injection member toward the first injection member.

12. The integrated cooling module of claim 11,
wherein the valve injection member, the filter injection member, and the COD injection member are provided in an integrated form.

13. A thermal management system comprising:
an integrated cooling module attached to a housing of a fuel cell stack;
a valve mounted on the integrated cooling module to control a flow of coolant; and
a coolant pump connected to a pump port provided in the integrated cooling module,
wherein the integrated cooling module comprises:
a first injection member including a plurality of regions and coupled to at least one second injection member, the plurality of regions configured to form spaces when coupled with the at least one second injection member,
wherein the spaces are configured to define a plurality of flow paths including a first flow path configured to flow a coolant discharged from the fuel cell stack into the valve,
wherein the plurality of regions of the first injection member comprises: a valve region defining the first flow path by being coupled to a valve injection member that is one of the at least one second injection member, and
wherein the valve and the integrated cooling module is connected without a pipe.

14. The thermal management system of claim 13,
wherein the pump port is provided to the first injection member, and
wherein the valve is coupled to a first surface of the first injection member which is opposite to a second surface of the first injection member, and the first injection member contacts the at least one second injection member on the second surface.

15. The thermal management system of claim 13,
wherein the first injection member is provided with a filter inlet and a filter discharge port connected to an ion filter, and
wherein the plurality of regions of the first injection member comprises: a filter region defining a second flow path of the plurality of flow paths, the second flow path configured to flow the coolant introduced from an ion filter into the valve by being coupled to a filter injection member that is one of the at least one second injection member.

16. The thermal management system of claim 15, further comprising: a COD heater provided to a groove defined in the integrated cooling module,
wherein the plurality of regions of the first injection member comprises: a COD heater region defining a third flow path and a fourth flow path of the plurality of flow paths, by being coupled to a COD injection member that is one of the at least one second injection member, and
wherein the third flow path is configured to flow the coolant introduced from the coolant pump into the COD heater and the fuel cell stack, and the fourth flow path is configured to flow the coolant discharged from the COD heater into the valve.

17. The thermal management system of claim 16,
wherein a first valve inlet is defined in the valve region and the coolant flows into the valve through the first valve inlet,
wherein a second valve inlet is defined in the filter region and the coolant flows into the valve through the second valve inlet,
wherein a third valve inlet is defined in the COD heater region in which the fourth flow path is defined so as to flow the coolant into the valve, and
wherein the first valve inlet, the second valve inlet, and the third valve inlet serve as ports directly communicating with the valve.

18. The thermal management system of claim 17,
wherein the valve is provided with a first port into which the coolant cooled by a radiator constituting the thermal management system of the fuel cell stack flows and a second port configured to flow the coolant into the coolant pump, and
wherein the valve and the first injection member are connected to the radiator, the fuel cell stack, the coolant pump, the COD heater, and the ion filter that constitute the thermal management system of the fuel cell stack.

19. The thermal management system of claim 13,
wherein the first injection member is provided with a radiator port supplying the coolant to a radiator, and
wherein the coolant discharged from the fuel cell stack flows into the radiator port through the first flow path.

20. The thermal management system of claim 13,
wherein the coolant flows into the valve and a COD heater through holes defined in the first injection member.

* * * * *